United States Patent
Ishikuro et al.

(10) Patent No.: US 7,616,259 B2
(45) Date of Patent: Nov. 10, 2009

(54) VIDEO CAMERA HAVING HARD DISK DRIVE AND OPTICAL DISK DRIVE

(75) Inventors: Shinichi Ishikuro, Yokohama (JP); Gen Okazaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 11/627,482

(22) Filed: Jan. 26, 2007

(65) Prior Publication Data

US 2007/0285517 A1  Dec. 13, 2007

(30) Foreign Application Priority Data

Jun. 13, 2006  (JP) ............................. 2006-162964

(51) Int. Cl.
*H04N 5/225* (2006.01)
(52) U.S. Cl. ...................... 348/374; 348/376
(58) Field of Classification Search .......... 348/373–376
See application file for complete search history.

(56) References Cited

U.S. PATENT DOCUMENTS

| | | | |
|---|---|---|---|
| 6,714,724 B1 * | 3/2004 | Cook | 386/117 |
| 2007/0201812 A1 * | 8/2007 | Nakagawa | 386/46 |
| 2008/0131097 A1 * | 6/2008 | Okazaki | 386/126 |
| 2008/0279537 A1 * | 11/2008 | Doba et al. | 386/124 |

FOREIGN PATENT DOCUMENTS

| | | |
|---|---|---|
| JP | 11-331656 | 11/1999 |
| JP | 2001-155474 | 6/2001 |
| JP | 2005-063600 | 3/2005 |
| JP | 2005-277958 | 10/2005 |

\* cited by examiner

*Primary Examiner*—David L Ometz
*Assistant Examiner*—Dillon Durnford-Geszvain
(74) *Attorney, Agent, or Firm*—Antonelli, Terry, Stout & Kraus, LLP.

(57) ABSTRACT

A video camera, building in a hard disk drive and an optical disk drive within the same housing, for dissolving a problem of increasing the temperature of hard disk drive due to heats generated within an inside of the main body thereof, comprises: an image pickup portion, which is configured to make photographing; a display portion 6, which is configured to display an image photographed; a hard disk drive 1 which is configured to record the image photographed therein; and an optical disk drive 9, which is configured to drive an optical disk being attached/detached, wherein the display portion 6, the optical disk drive 1, the hard disk 9 are disposed in that order, and the hard disk drive 1 is disposed on a cover portion to be opened when taking out the optical disk from the optical disk drive 9.

5 Claims, 6 Drawing Sheets

GRIP SIDE

VIDEO CAMERA HAVING HARD DISK DRIVE AND OPTICAL DISK DRIVE

BACKGROUND OF THE INVENTION

The present invention relates to a video camera, and in particular, it relates to an arrangement or disposing of a hard disk drive and an optical disk drive therein.

In recent years, there are various types for the video cameras, such as, enabling to store data onto a vide magnetic tape, an optical disk, a hard disk, and/or a memory card, for example. There are also types having a plural number of recording means, in common, for recording images onto a plural number of recording media, i.e., combining the video magnetic tape and the memory card, combining the optical disk and the memory card, and combining the hard disk and the memory card, in the structures thereof.

In the following Patent Document 1 is described the following:

"The video camera has a front-side lens portion, a rear-side view finder, a grip portion disposed on the right-hand side seeing from the rear-side, and a liquid crystal monitor on a cover portion disposed on the right-hand side seeing from the rear-side, wherein a slot portion is provided for insertion of an external memory on the cover portion for the portion for inserting the magnetic tape cassette therein, which is disposed on the right-hand side seeing from the rear-side thereof, while providing an inlet of this slot portion on the front-side thereof (see the Abstract). Also, in a column [0011] of that publication is described, "as the external memory 30 may be included various kinds of card-type or disk-type recording media, such as, a PC card, a picture card, and a floppy disk, etc."

Also, in the following Patent Document 2 is described the following:

"The digital video camera 11 . . . records the photographed data on to the hard disk apparatus . . . . the recording apparatus 20, being able to connect with the video camera 11 through a connector provided on a side surface thereof, takes the photographed data of images selected therein, so as to record them onto the optical disk "d" (see the Abstract)."

[Patent Document 1] Japanese Patent Laying-Open No. Hei 11-331656 (1999); and

[Patent Document 2] Japanese Patent Laying-Open No. 2005-277958 (2005).

SUMMARY OF THE INVENTION

In recent years, under the condition of achieving an improvement on the quality of pictures, accompanying with advancements on the digitalization of data, a requirement comes to large, in particular, for a disk and/or a semiconductor memory, which is accessible at random, in the place of the conventional magnetic tape.

In particular, the data capacity comes to be large for moving pictures, and also accompanying with high-definition of the pictures in the recent years, there is a necessity of a new recording medium, in particular, for the purpose of recording the moving pictures for a long time.

The optical disk is larger in the memory capacity and also cheaper than the semiconductor memory, and it is a recording medium of being exchangeable. Thus, for the optical disk, it is possible to make recording for a long time, with using plural pieces of the optical disks, and also the optical disk is suitable for reservation or storage for a long time-period; however, it is impossible to achieve a continuous long-time recording with using only one (1) piece of the optical disk. Thus, the recording must be interrupted during the time when exchange is made on the optical disk.

The hard disk has a large memory capacity and is suitable for the continuous long-time recording; however since the had disk cannot be exchanged, there is a necessity of deleting video data on the hard disk, through dubbing the video data already recorded thereon into other recording medium, when the remaining capacity comes down to zero (0) or to be small. In particular, since it is desirable to keep the video data, which are recorded by the video camera, but without deleting them, therefore it is necessary to conduct the following operations, frequently, i.e., deleting the video data on the hard disk while dubbing the video data on that hard disk to an optical disk. For this reason, an advantage is large of enabling to make the dubbing on the video data, which are recorded continuously for a long time, easily onto the optical disk, while building the a hard disk drive for driving the hard disk and an optical disk drive for driving the optical disk within the same housing thereof.

However, within the video camera described in the Patent Document 1 mentioned above, no consideration is paid on combining the optical disk and the hard disk therein. Also, there be found an insufficient aspect in the disposition, i.e., for a photographer to hold the video camera easily.

Also, for achieving a video camera, which builds in the hard disk drive and the optical disk drive within the same housing, it is necessary to dissolve a problem of heat generated within an inside of the video camera. As main heat-generation sources within the video camera may be considered semiconductors, such as, a CPU (Central Processing Unit) and/or an IC, etc., and/or the hard disk drive and the optical disk drive. In particular, since the hard disk drive generates heats from a driving mechanism thereof and is weak or easily affected from a high-temperature environment, therefore it is important to make up an arrangement of the hard disk drive and the optical disk drive, by taking the heats into the consideration thereof.

However, within the video camera shown in the Patent Document 2, a housing of the video camera side building the hard disk drive therein is separated from other housing building the optical disk drive therein; there is no consideration paid upon building up the hard disk drive and the optical disk drive within the same housing.

For dissolving the problems mentioned above, according to the present invention, there is provided an imaging apparatus, comprising: an image pickup portion, which is configured to make photographing; a hard disk drive, which is configured to record an image photographed therein; an optical disk drive, which is configured to drive an optical disk being attached/detached; and a controller portion, which is configured to process the image photographed, to be recorded into said hard disk drive or said optical disk drive, wherein a substrate mounting said controller portion, said optical disk drive, and said hard disk drive are disposed one by one in direction of rotation axes of said optical disk and said hard disk.

According to the means mentioned above, it is possible to provide a video camera being superior usability for a user thereof, for example.

Objects, means and effects other than those mentioned above may by made apparent by the embodiments, which will be mentioned later.

BRIEF DESCRIPTION OF THE DRAWINGS

Those and other objects, features and advantages of the present invention will become more apparent from the following description when taken in conjunction with the accompanying drawings wherein.

DETAILED DESCRIPTION OF PREFERRED EMBODIMENTS

Hereinafter, embodiments according to the present invention will be fully explained by referring to the attached drawings. Although being preferable, in particular, for a video camera, being required to be small in the sizes and dealing with a plural number of recording media therein, however not limited only to this, the present invention is also applicable to other apparatuses than the video camera, each of which has a recording apparatus and an operating portion thereof. Also, the video camera means an apparatus for photographing moving pictures, however not needed to be exclusive use for the moving picture, but it may take a still picture therewith.

Embodiment 1

Explanation will be made on an example of the external structures of a video camera, by referring to FIGS. 1 and 2 attached herewith.

Figure 1:
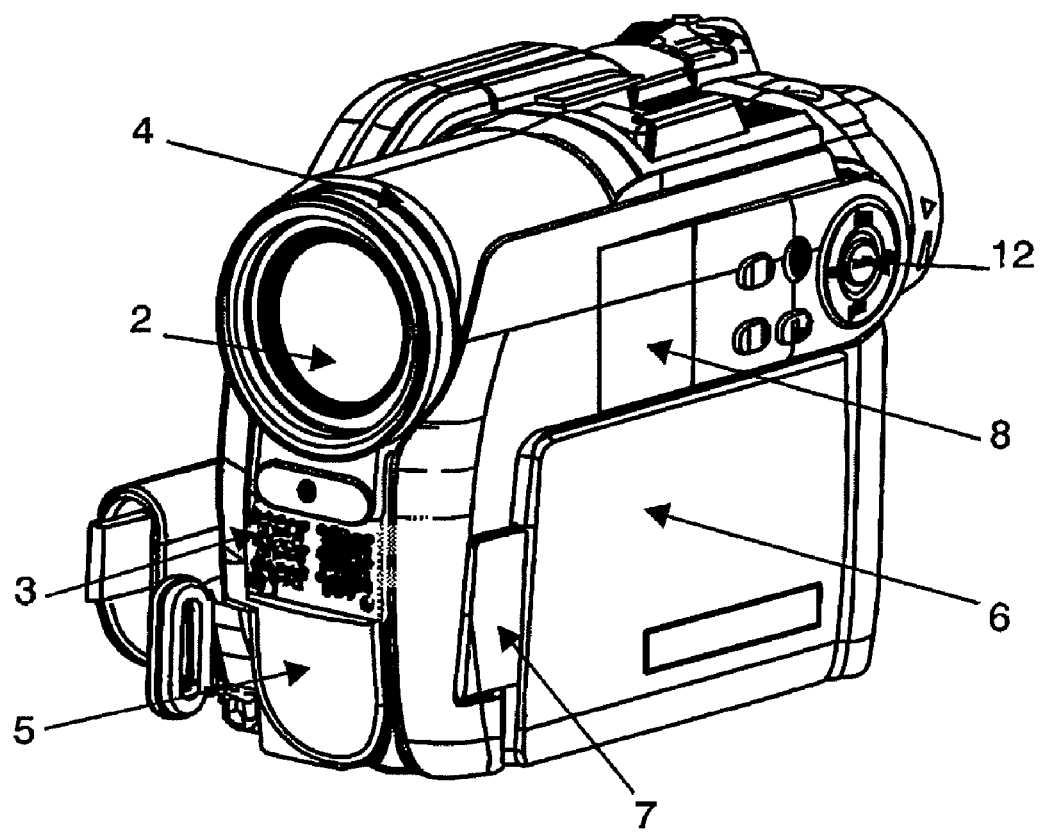
FIG. 1 is an example for showing the front perspective view of a video camera.
Figure 2:
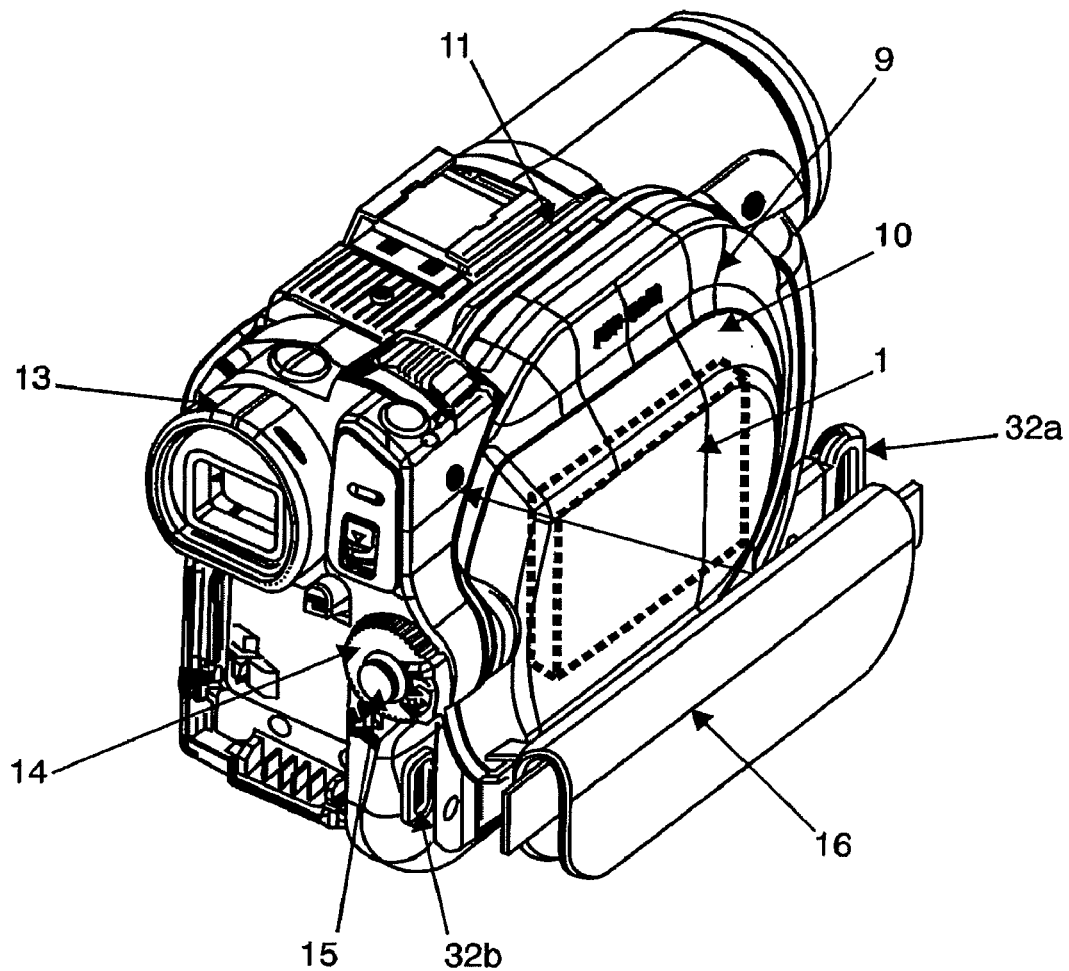
FIG. 2 is an example for showing the rear perspective view of the video camera.

FIG. 1 is a front perspective view of the video camera while FIG. 2 a rear perspective view thereof.

The video camera is constructed, separately, with a front side, which comprises a lens portion 2 for entering an optical image of an object to be photographed, a microphone portion 3 for collecting sounds, such as, voices, a lens cover 4 building up a wrapping and a front portion 5, etc., a display side, which comprises a display portion 6 for displaying the images or the like when photographing or reproducing, a fulcrum portion 7 of the display portion and a disk cover including a main body case, etc., a grip side, which comprises a disk cover 9, being a cover portion, a hard disk drive cover 10 and a R case 11, etc., and a rear side, which comprises an EVF (Electric View Finder) portion 13, a battery (not shown in the figure), etc. In the interior of the lens portion 2 are provided a mechanism for adjusting an optical zoom and/or an iris, as well as, a sensor of an image pickup element (CCD (Charged Coupled Devices) and/or a sensor of a CMOS (Complementary Metal Oxide Semiconductor). The display portion 6 and the EVF portion 13 may be constructed with the same LCD (Liquid Crystal Display) and/or the same ELD (Electro Luminescence Display), or may be constructed with other displays, separately.

The display portion 6 can be opened/closed or rotated around the fulcrum portion 7 of the display portion, i.e., being adjustable at an angle suitable for the condition of use. Thus, the display portion 6 can be directed into an inside of the video camera, not exposing the display surface thereof to an outside, as is shown in FIG. 1, or on the contrary, exposing the display surface to the outside, so that a photographer can see the display surface from the rear side. On a surface neighboring thereto when the display portion 6 is closed are arranged a reproduce operation button 12, which is mainly used when reproducing. A mode switch knob 14 provided on the rear side is used for turning ON/OFF of a power source, and also switching of the recording medium and a photographing mode, i.e., between a hard disk drive and an optical disk and between moving pictures/still pictures. A video recording button 15 is a start/stop button for video recording. On the grip side is provided a grip belt 16 for holding the back of a hand or a wrist of the photographer when she/he holds the video camera, passing through it from a bottom surface side of the video camera, so that the camera does not fall down if she/he unlikely loosens it's hold.

The R case 11 protects the optical disk drive for recoding the moving picture onto the optical disk, i.e., insertion and removal of the optical disk into/from the optical disk drive cannot be made through opening the disk cover 9. As such the optical disk may be applied a BD (Blu-ray Disc) and a HD (High Definition)-DVD, as well as, various kinds of DVDs, such as, a DVD-R, a DVD+RW, etc. Herein, an optical disk having a diameter of 8 cm is shown, for an example, but it should not be restricted only thereto.

Also, within an inside of the disk cover 9 is provided a hard disk drive 1 for recording the moving picture thereon, and the hard disk drive 1 is covered with the hard disk drive cover 10, for the purpose of protection of that hard disk drive 1. Further, the hard disk drive 1 is attached or mounted through a hard disk drive dumper, being formed from a material, which is low in the heat conductivity thereof. An optical disk drive 21 is provided between them, so that the heat generated from the substrate (CPU etc.) is hardly transmitted to the hard disk drive 1.

Figure 5:
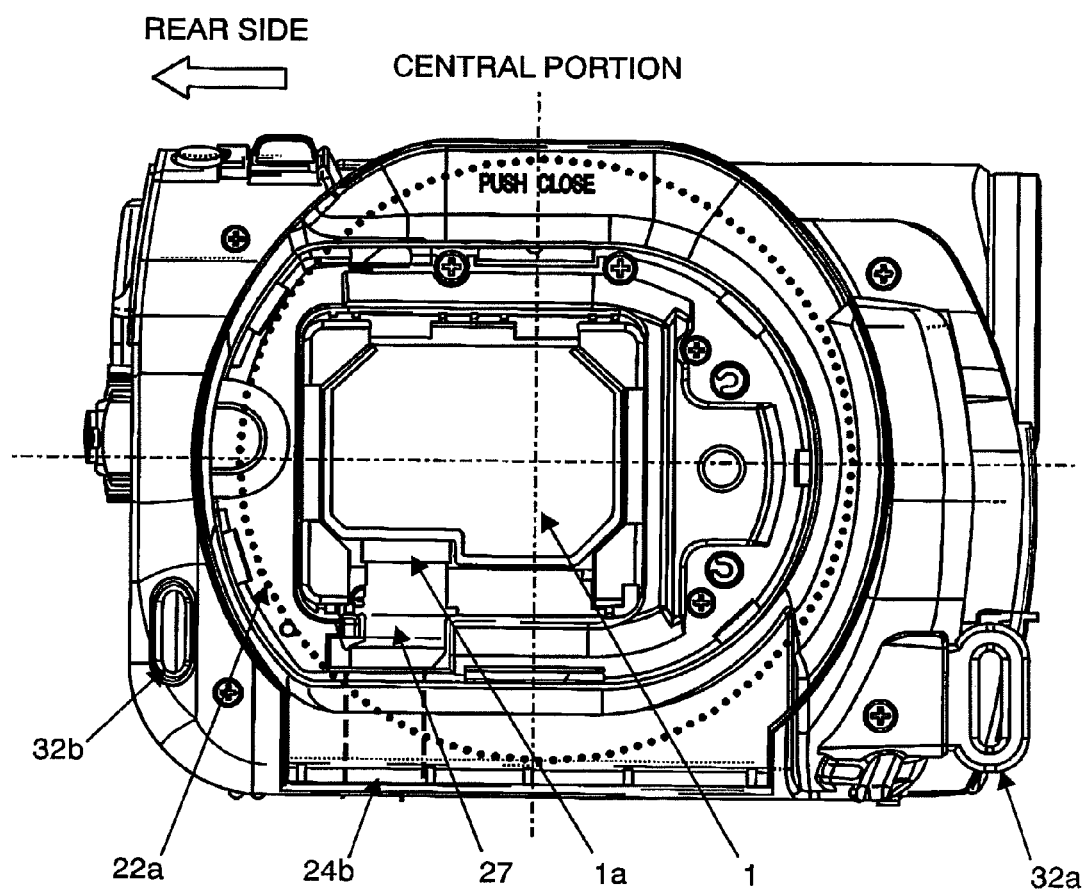
FIG. 5 is an example for showing the video camera seeing from a grip side thereof.

Herein, the hard disk drive cover 10 has the structures expanding in a portion where the hard disk drive 1 is received therein, and the grip belt 16 is arranged on a portion (i.e., the bottom surface side) lower than the hard disk drive 1; then, when the photographer holds the present video camera with passing her/his hand through the grip belt 16, the expanding portion of the hard disk drive cover 10 touches on the palm of her/his hand, while the grip belt 16 comes down to the position at the wrist of her/his hand or that near to it, but without pushing the expanding back of the hand by the grip belt 16, and therefore, it can be hold easily. Referring to FIG. 5, which will be mentioned later, it can be seen that a line connecting between the upper portions of the belt holders 32a and 32b, which stop the grip belt 16 at the both ends thereof, lies on the bottom surface side (i.e., the lower side) lower than the lower side of the hard disk drive 1. Also, since the hard disk drive 1 is disposed on a cover portion on the grip side, the center of gravity is shifted to the side of the palm for the weight of the hard disk drive 1, and therefore it can be handled, easily. Also, the hard disk drive 1 will not operate under low temperature (i.e., below zero (0) ° C. or the like). With such the structures of the present embodiment, because it can be warmed with the body heat of the hand, it is possible, for the photographer, to make photographing, by recording the pictures onto the optical disk, which is relatively tolerant to the low temperature, for a moment, while worming up the hard disk on her/his hand, for example, in case when the camera grows cold in a skiing ground, etc.

However, with the present embodiment, although there is also shown an example, wherein the grip belt 16 is disposed into the direction along with, but not completely in parallel with the bottom surface, since there is shown an example of the structures for supporting the camera by a hand from the bottom surface side thereof, but the video camera may be so constructed to be held from the rear side thereof. In such the case, the grip belt is arranged into a direction, near to perpendicular to the bottom surface direction and along with the rear side, but not along with the bottom surface. In this instance, it is preferable to locate the grip holder to be near to the rear side than the hard disk 1, i.e., on the side where the photographer passes her/his hand through.

Further explanation will be made on the interior structures of the video camera, by referring to FIGS. 3 to 7.

Figure 3:
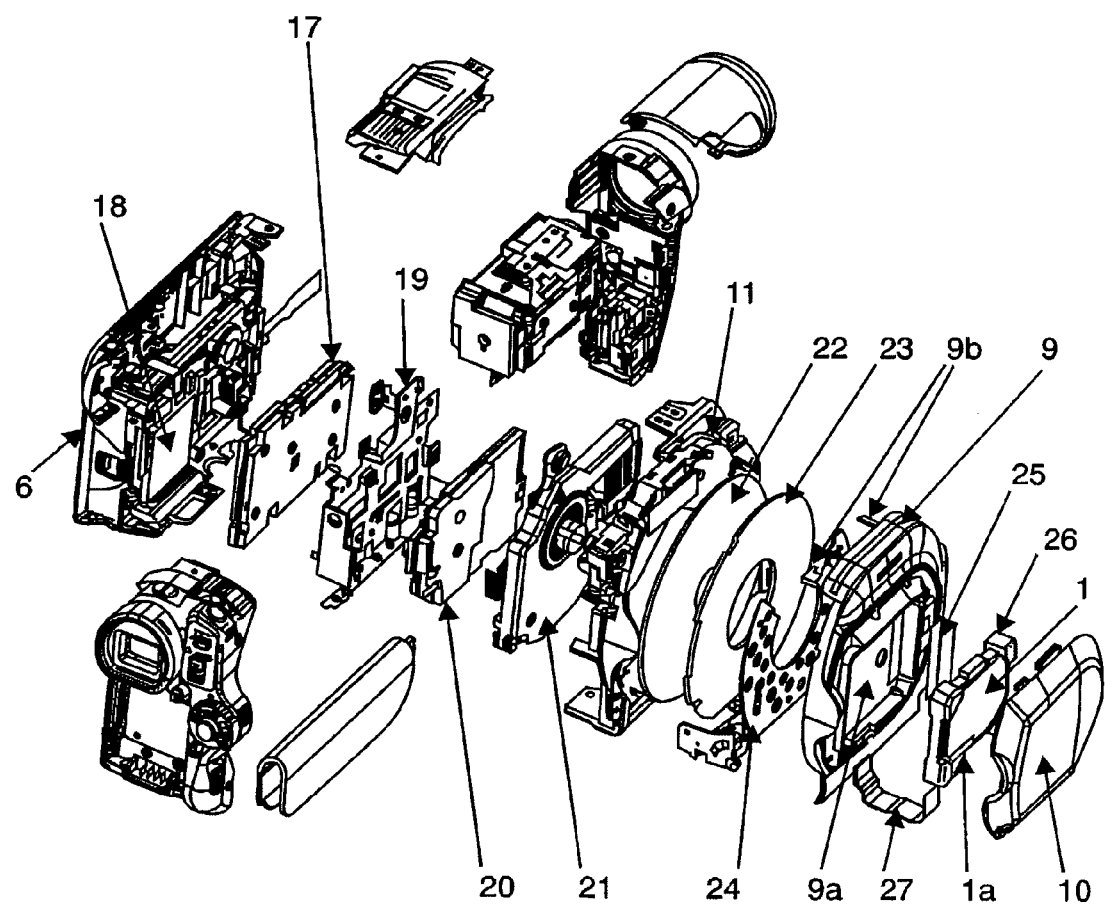
FIG. 3 is an example for showing an exploded view of the entire structures of the video camera.
Figure 3:

FIG. 3 is an exploded view of the entire of the video camera.

At a central portion of the video camera is disposed a first main substrate 17, which mounts electric parts thereon, relating to a main system of the present video camera, such as, video signal processing and various kinds of controls, for example, and it is fixed on a mechanical frame 19 made of a metal. Thus, on the first main substrate 17 are mounted various kinds of semiconductor electric parts, and energy consumption of those electric parts is large, thereby generating heats therefrom. At the side of the display portion 16 on the first main substrate 17 is provided a memory card slot 18, to be inserted with a recording medium for recording the still picture therein, which is tolerant of heat and having no driving portion. Also, on the opposite side (i.e., the grip side) of the first main substrate 17, seeing from the mechanical frame 19, there are disposed a second main substrate 20, mounting electric parts for controlling/driving the optical disk drive 21 and electric parts for use of a power circuit, and the optical disk drive 21 for inserting or loading the optical disk 22 therein and recording/reproducing it. However, the second main substrate 20 also generates heats from the electric parts mounting thereon. On the grip side of the optical disk drive 21 are provided the R case 11, being the wrapping portion, on which a lock mechanism (not shown in the figure) for holding the disk cover 9 into the closed condition, a hinge portion 24 of a opening/closing mechanism for opening/closing the disk cover 9, and the disk cover 9.

On the hinge portion 24 disposed on the disk cover 9 is stuck a cushion 23 for use of protecting the optical disk 22 from scratching and for use of reducing noise sounds. And it is so constructed that the optical disk 22 can be disposed between that cushion 23 and the R case 11. The optical disk 22 is fixed by the optical disk drive 21. Also, the disk cover 9 is brought into the closed condition when a hooking portion 9b provided on the disk cover 9 is held by the lock mechanism provided on the R case 11, while it into the opened condition when the hooking portion 9b comes off from the lock mechanism, and thereby brining the optical disk 22 to be exchangeable. Within the hinge portion 24, a rotating axis thereof is called by a hinge axis 24b.

Between the disk cover 9 and the hard disk drive 1, there is provided a magnetic shield plate 25 in about "L"-like shape for reducing the agnostic force from the optical pickup, which is provided in the optical disk drive 21. With the hard disk drive 1 is connected a FPC (Flexible Painted Circuit) 27 through a connector 1a. Further, for the purpose of protecting from shock when it falls down, the hard disk drive 1 is received within a recess 9a of the hard disk cover 9, being covered with a hard disk drive dumper 26 on the outer periphery thereof, and further it is covered with the hard disk drive cover 10, building up the wrapping for protecting it from being contacted from an outside.

Figure 4:
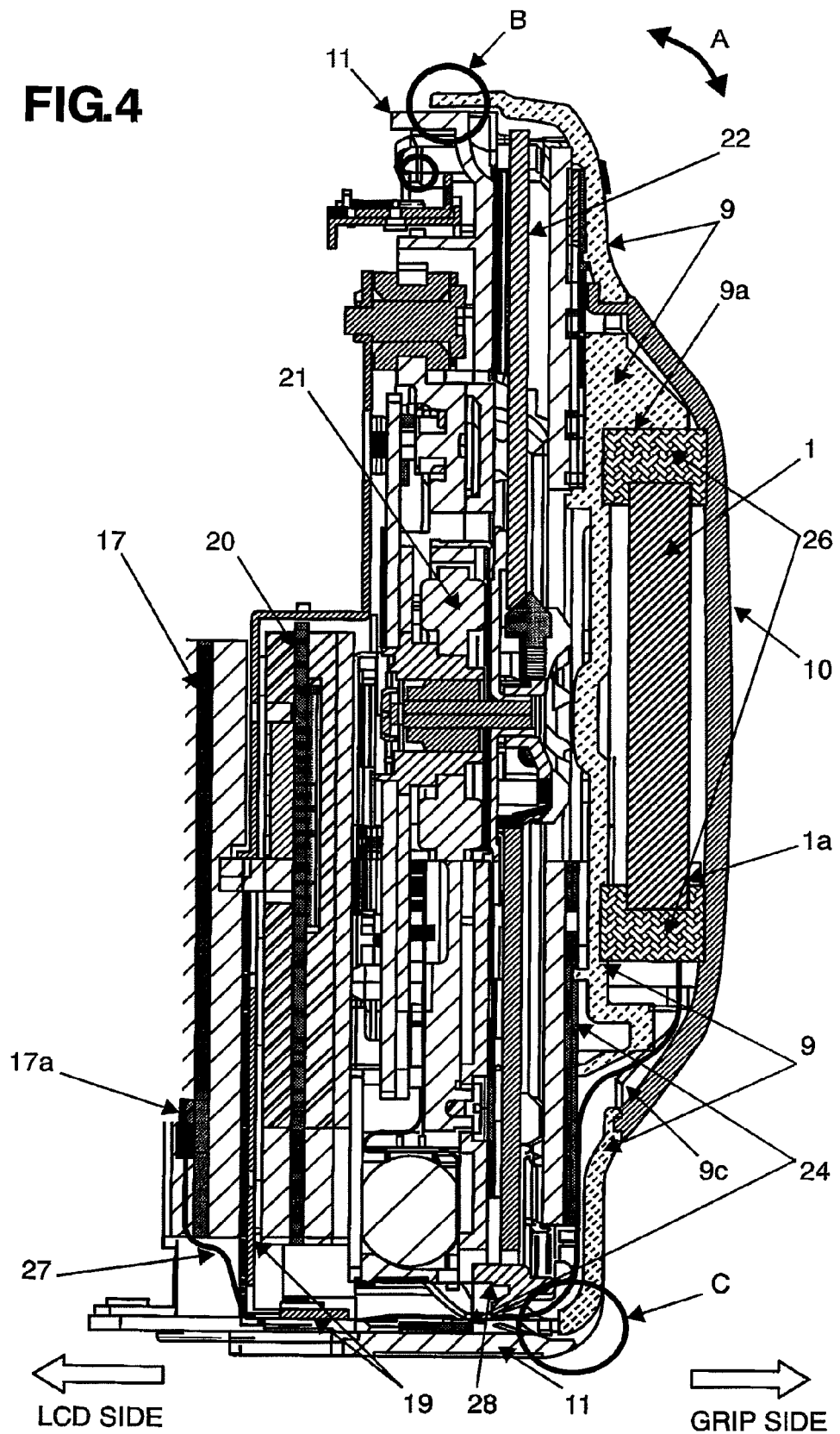
FIG. 4 is an example for showing the cross-section view of the video camera, in particular, seeing from the rear side thereof.

FIG. 4 shows the cross-section view of the video camera, seeing it from the rear side.

On the LCD (Liquid Crystal Display) side of the mechanical frame 19 is attached the first main substrate 17, while on the grip side thereof is attached the second main substrate 20, and on the side of the second main substrate 20 are disposed the optical disk drive 21 and the R case 11, which builds up the wrapping. On the lower portion of the R case 11 is attached the hinge portion 24, which is attached with the disk cover 9, while the upper portion thereof is so constructed that the hooking portion 9b of the disk cover can be held by means of the lock mechanism, and thereby being constructed to be opened/closed into an "A" direction from the above. A user operates an eject button or the like when she/he tries to take out the optical disk 22, so as to open the disk cover 9, and thereby taking out the optical disk 22, which was inserted or loaded into the optical disk drive 21. Although the explanation was made that the disk cover can be opened/closed at the upper side thereof, but it can be opened/closed at a front side thereof, for example.

Since the disk cover 9 is connected with the R case 11 of the main body side, through a "C" portion with the hinge portion 24 of the open/close mechanism and a "B" portion with the lock mechanism, a number of routes is small, for conducting heats from the first main substrate 17 and the second main substrate 20, etc., to the side of the hard disk drive 1, thereby making up the structures, in which the heats generated from the main body side can be hardly transmitted to the side of the hard disk drive 1.

Into the recess 9a of the disk cover 9 is received the hard disk drive 1, an outer periphery of which is covered with the hard disk drive dumper 26, and the hard disk drive 1 is further covered with the hard disk drive cover 10 for protecting from being in contact with an outside. Herein, fixing the hard disk drive dumper 26 under the condition of being compressed brings the hard disk drivel into a floating condition, thereby building up the structure for absorbing the vibration generated when it is held and/or the shock when it falls down.

Also, the hard disk drive 1 and the first main substrate 17 are connected by means of the FPC 27. Thus, the hard disk drive 1 is connected, from a connector 1a thereof passing through lower portions of the optical disk 22 and the optical disk drive 21, to a connector 17a of the first main substrate 17.

By the way, when the user falls the video camera directing the grip side thereof down, it can be expected that the shock when falling is absorbed by the grip belt 16. Then, according to the present embodiment, for the purpose of lessening the shock from the side of the display portion, for example, thickness of the hard disk drive dumper 26 on the side of the disk cover 9 is thicker than that on the hard disk drive dumper. For example, the thickness on the side of the hard disk drive cover is selected to be 1.7 mm while the thickness on the side of the disk cover 9 is 1.8 mm.

Also, a space where the hard disk drive 1 occupies is separated from an inner space of the main body, receiving therein the first main substrate 17 and the second main substrate 20 and so on, in the structure thereof. With this structure, the hears generated from side of the main body having large heat generation can hardly transfer to side of hard disk drive 1 having small heat generation, thereby bringing about an effect of suppressing an increase of space temperature on the side of the hard disk drive 1, thereby to be lower than that within an inner space on the side of the main body. Thus, since the first main substrate 17 and the second main substrate 20 generate the heats, and the display portion 6 also generates the heats, and then it can be thought that arranging or disposing the hard disk drive 1 in vicinity of the first main substrate 17 and the second main substrate 20 gives ill influences to the operation and/or the lifetime of the hard disk drive 1, therefore it is preferable that the hard disk drive 1 is disposed in this manner, i.e., separating it from the main body, and further separating it within another space by disposing a partition therebetween. Also, using the hard disk drive dumper 26 having a low heat conductivity enables to suppress the heat conduction of the heats, which are transferred from the main body to the disk cover 9, into the hard disk drive 1.

Also, the optical disk 22 has an increase of temperature on one side surface, due to the heats from the heat generating portions, such as, the substrates, etc., on the main body, however since an increase of temperature is also made on the opposite side surface thereof, due to heats generated from the hard disk drive 1, therefore it is possible to make temperature difference small between both surfaces of the optical disk 22, and thereby also dissolving the problem that the optical disk 22 is warped due to the temperature difference between both sides of the optical disk.

Also, arrangement of the hard disk drive 1 on the grip side shifts the gravity center of the camera, from the display portion 6 where the weight has been taking, into the grip side, and thereby bringing about an effect of bringing the video camera to be held and handled, easily by the user. Further, arrangement of the hard disk drive 1 on the grip side enables the hard disk cover 10 to build up the expanded configuration, fitting to a hand of the user, thereby bringing about an effect of easy holding, as well as, compensation of movement of the hand.

From the above, arrangement of the hard disk drive 1 on the outer surface side of the disk cover 9, to suppress down the conductivity of heats, which are mainly generated from the main substrates within an inside of the main body, into the hard disk drive 1, brings about an effect of reducing an increase of temperature of the hard disk drive 1. Also, under the condition of low temperature, since the disk cover 9 and the hard disk drive cover 10 build up a holding portion when the user photographs, holding on the hand, thereby warming the camera with the body heat through the disk cover 9 and the hard disk drive cover 10, it is possible to reduce generation of errors in writing operation.

Also, as is shown in FIG. 4, one end of the FPC 27 connected to the connector 1a of the hard disk drive 1 is connected, passing through a hole 9c provided on the disk cover, passing between the disk cover 9 and the hinge portion 24, passing between the hinge portion 24 and an under piece 28, and also passing below the mechanical frame 19, to the connector 17a provided on the first main substrate 17, in the structures thereof.

FIG. 5 shows a perspective view of the video camera, seeing from the grip side thereof. However, this FIG. 5 shows the condition where the hard disk drive cover 10 and the grip belt are removed.

As is shown in FIG. 5, the FPC 27 connected with the connector 1a of the hard disk drive 1 is disposed onto the rear side than the central portion of the optical disk 22 (see the dotted lines), seeing from the grip side, and it is connected to the first main substrate 17, passing through an inside on the bottom surface below the optical disk 22, in the structures thereof. In case where the FPC 17 passes under the optical disk 22, being a movable portion, it is required that they are disposed separating from each other at a distance, being equal or larger than a predetermined size (for example, 0.5 mm or larger than that), so that they do not strike each other due to vibrations and shocks, etc. For this reason, the FPC 27 is located, not under the central portion of the optical disk 22, but shifting from that central portion, and therefore it is possible to separate them from each other, at the distance therebetween. In this manner, with the structures of passing the FPC at the position shifting from the center of the optical disk enables an effect of lowering the height of the present video camera.

Next, explanation will be given on an example of attaching the hard disk drive, by referring to FIG. 6.

Figure 6:
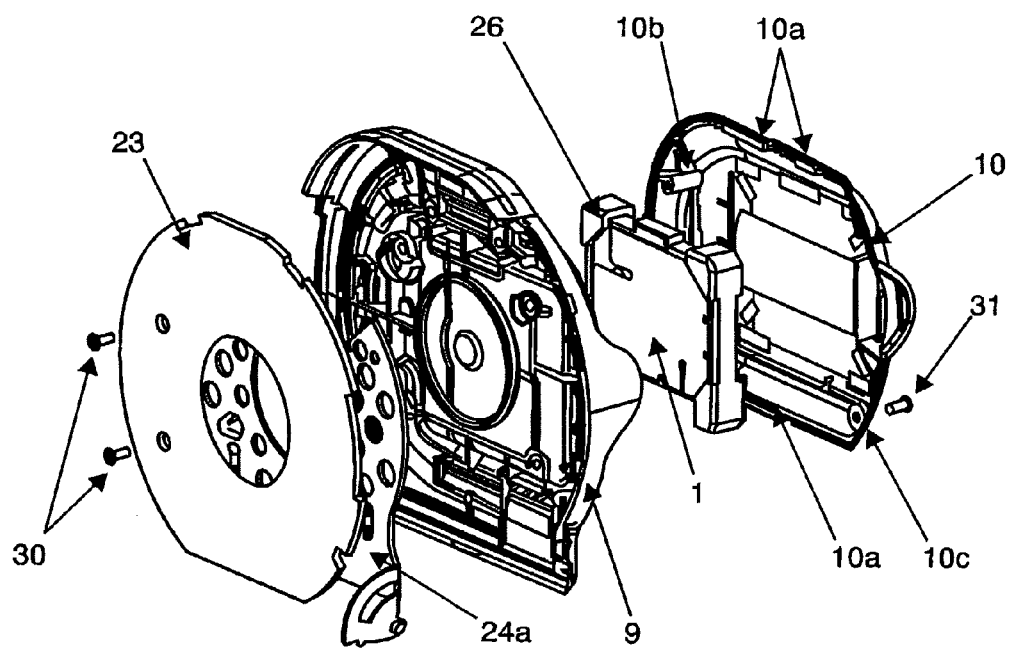
FIG. 6 is an example for showing the structures of a cover portion of the video camera.

FIG. 6 is a view for showing the structures of the cover portion of the video camera.

For the purpose of protecting the hard disk drive 1 from shocks when the camera falls down, the hard disk drive 1 is covered with the hard disk drive dumper 26 on the outer periphery thereof, and further for the purpose of protecting it from being contacted with an outside, the hard disk drive 1 is covered with the hard disk drive cover 10. Fixing the hard disk drive dumper 26 under the condition of being compressed brings the hard disk drive 1 into the floating condition; thereby building up the structure for absorbing the vibration generated when it is held and/or the shock when the camera falls down. The hard disk drive cover 10 is fixed by means of a claw 10a, provisionally, onto the disk cover 9. Also, in such the structures thereof, screw bosses 10b (two (2) spots), which are provided on the hard disk drive cover 10, are screwed by a screw 30, from the cushion 23 stuck on the hinge 24a, which is provided on the display portion side of the disk cover 9, to be fixed, and further the disk cover 9 is screwed by a screw 31 with a screw clamping hole 10c of the hard disk drive cover 10 from an outside thereof. From this, it has such the structures that exchange and maintenance can be conducted easily, when the hard disk drive 1 has a trouble therein. Also, changing processing on the surface of the hard disk drive cover 10 brings about an affect of expanding the degree of freedom of design of the camera.

Explanation will be made about the structures of the magnetic shield plate 25 of the video camera, by referring to FIG. 7 attached herewith.

Figure 7:
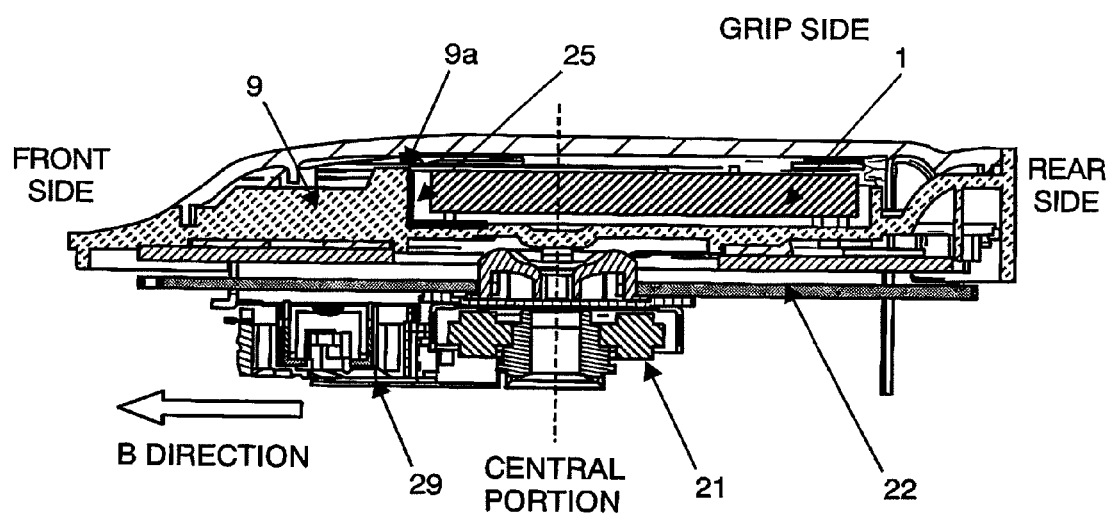
FIG. 7 is an example for showing the cross-section view seeing from an upper surface of the video camera.

FIG. 7 is a cross-section view of the video camera seeing from an upper surface thereof. However, this FIG. 7 shows the condition when the position of a pickup portion 29, being disposed in the optical disk drive 21 and for driving an objective lens through electromagnetic force, reaches to the innermost periphery of the optical disk 22.

In this manner, a rotation surface of the optical disk drive 21 and a rotations surface of the hard disk drive 1 are disposed almost in parallel with each other, wherein those rotation surfaces a covered with in a potion thereof (but, not in contact with), but rotation axes of them are shifted from each other, i.e., not crossing with each other.

The pickup portion 29 disposed within the optical disk drive mechanism 21 has the structure of moving from the central portion of the optical disk 22 to a front side (i.e., into the direction of an arrow "B"). The magnetic shield plate 25 in about "L"-like shape is disposed in the recess 9a of the disk cover 9 between the pickup portion 20 of the optical disk drive 21 and the hard disk drive 1. The nearer the distance between the pickup portion 29 and the hard disk drive 1, the worse influences are given onto the hard disk drive 1, such as, a writing error or the like, for example. When the pickup portion 29 lies on the innermost periphery of the optical disk 22, the distance comes to be nearest from the hard disk drive 1, and the ill influences due to the magnetism is reduced as it moves to the outermost periphery side. For that reason, with provision of the recess 9a so as to dispose the hard disk drive 1 on the rear side of the disk cover 9, i.e., far away from the pickup portion 29, the hard disk drive 1 is kept away from the magnetic portion of the pickup portion 29. Further, disposing the magnetic shield plate 25 in about "L"-like shape into the recess 9a of the disk cover 9 between the pickup portion 29 of the optical disk drive mechanism 21 and the hard disk drive 1 reduces the ill influences from the pickup portion 29. Also, since the pickup portion 20 cannot move into the rear side than the central portion of the optical disk 22, there is no necessity of providing the magnetic shield plate 25 in the rear side than the central portion of the optical disk 22, therefore no magnetic shield plate 25 is provided in the rear side than the central portion of the optical disk 22. With this, there can be obtained an effect of making the sizes of the magnetic shield plate 25 as small as possible.

Within the present embodiment, the explanation was made, in particular, on the case where the circuit board of the optical disk drive and the circuit board for use of driving thereof are separated from each other, but the circuit board for use of driving may be included on that of the optical disk drive.

Within the present embodiment, the explanation was made, in particular, on the case where the hard disk drive is provided on the cover portion to be opened/closed for taking out the optical disk therefrom; however, the present invention is also applicable into the case of the video camera of a front loading type, in which a tray is pushed in and out for taking the optical disk therefrom, but disposing the hard disk drive mentioned above on the side of the optical disk drive where the optical disk is inserted or loaded therein.

Within the present embodiment, the hard disk drive is disposed on an outer side of the optical disk drive (i.e., the opposite side of the display portion 6 and/or the substrates 17 and 20, with respect to the optical disk drive); however, the hard disk drive may be disposed within the optical disk (i.e., between the substrate 20, or between the display portion 6 and the substrate 17, etc.). But, in this case, since there is an anxiety that heats from the LCD, the substrates and/or the optical disk give ill influences onto the hard disk drive, it is preferable to provide the hard disk drive in an outside of the optical disk, having such the advantages as was mentioned above.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. A video camera comprising:
   an image pickup portion to photograph an image;
   a hard disk drive to record a photographed image;
   an optical disk drive to drive an optical disk which is at least one of attached to and detached from the optical disk drive; and
   a controller portion that causes said image pickup portion to photograph an image, processes the photographed image, and then causes said hard disk drive or said optical disk drive to record the image;
   wherein a substrate mounting said control portion thereon, said optical disk drive, and said hard disk drive are disposed in this order in a direction of a rotation axis of said optical disk and said hard disk; and
   wherein said hard disk drive is disposed on a cover portion to be opened when taking out an optical disk from said optical disk drive.

2. The video camera as claimed in claim 1 having a display portion to display video information,
   wherein a controller board is disposed between said display portion and said optical disk; and
   wherein a line interconnecting said hard disk drive and said board is passed between a hinge portion with which said cover portion is one of opened and closed and said cover portion.

3. The video camera as claimed in claim 2, wherein said line is disposed at a position off the intersection of a center of an optical disk loaded in said optical disk drive and a hinge axis of said hinge portion.

4. A video camera comprising:
   an image pickup portion to photograph an image;
   a hard disk drive to record a photographed image;
   an optical disk drive to drive an optical disk which is at least one of attached to and detached from the optical disk drive; and
   a controller portion that causes said image pickup portion to photograph an image, processes the photographed image, and then causes said hard disk drive or said optical disk drive to record the image;
   wherein a substrate mounting said controller portion thereon, said optical disk drive, and said hard disk drive are disposed in this order in a direction of a rotation axis of said optical disk and said hard disk drive;
   wherein a rotation center of said optical disk drive is off a rotation center of said hard disk drive; and
   wherein an optical axis of an optical pickup of said optical disk drive does not intersect with a magnetic disk of said hard disk drive.

5. The video camera as claimed in claim 4, wherein a magnetic shield is disposed in a narrowest space between the optical pickup for said optical disk and said hard disk drive.

* * * * *